March 15, 1932. F. J. STRAUB ET AL 1,849,890
MEANS FOR PREVENTING BACK MOVEMENT IN MOTOR VEHICLES
Filed Sept. 7, 1927  3 Sheets-Sheet 1
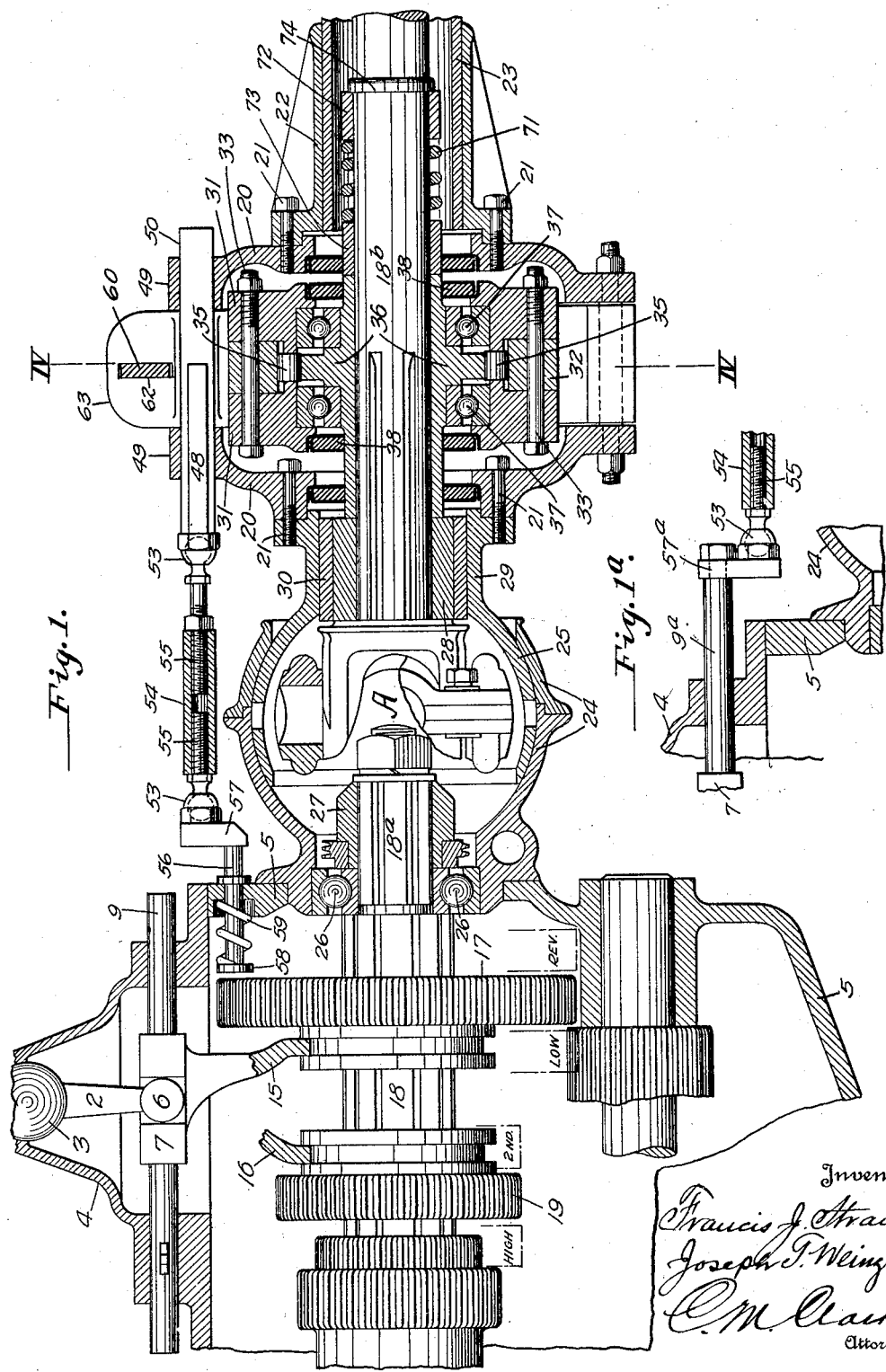

March 15, 1932. F. J. STRAUB ET AL 1,849,890
MEANS FOR PREVENTING BACK MOVEMENT IN MOTOR VEHICLES
Filed Sept. 7, 1927 3 Sheets-Sheet 2
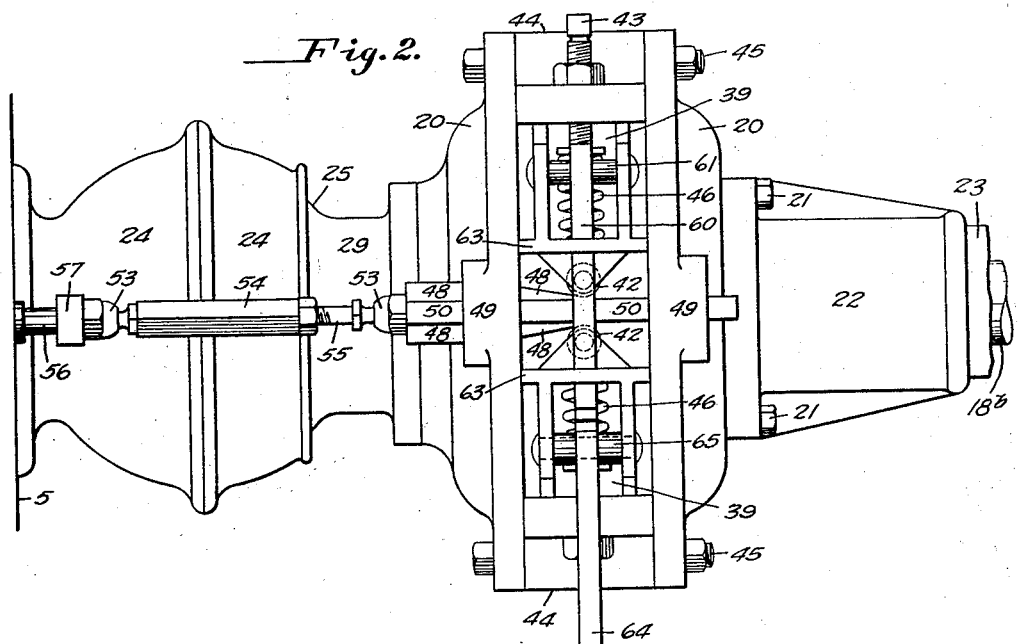
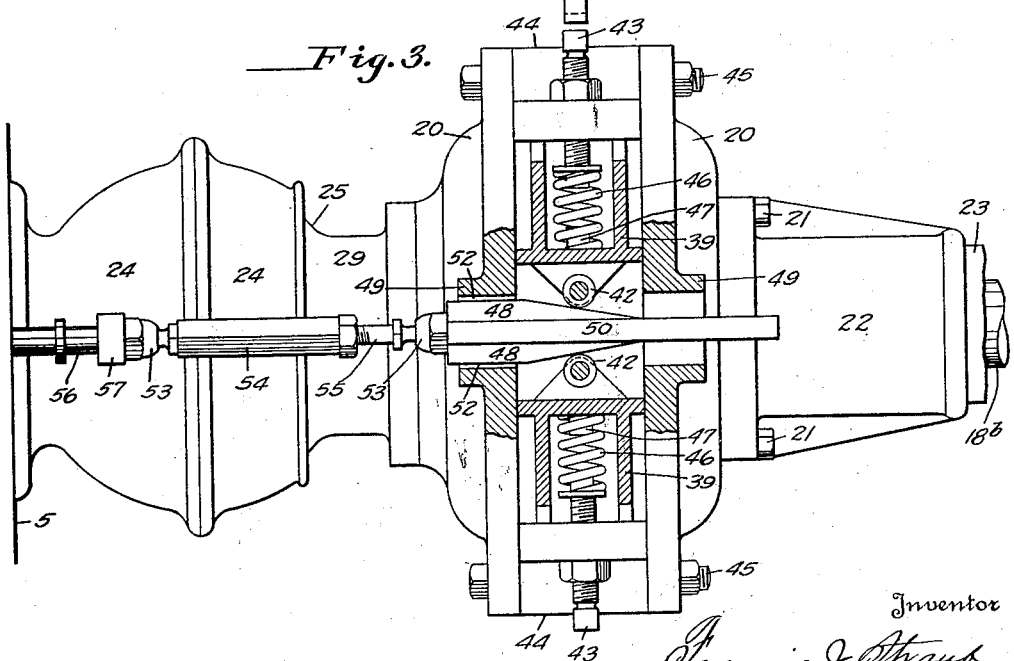

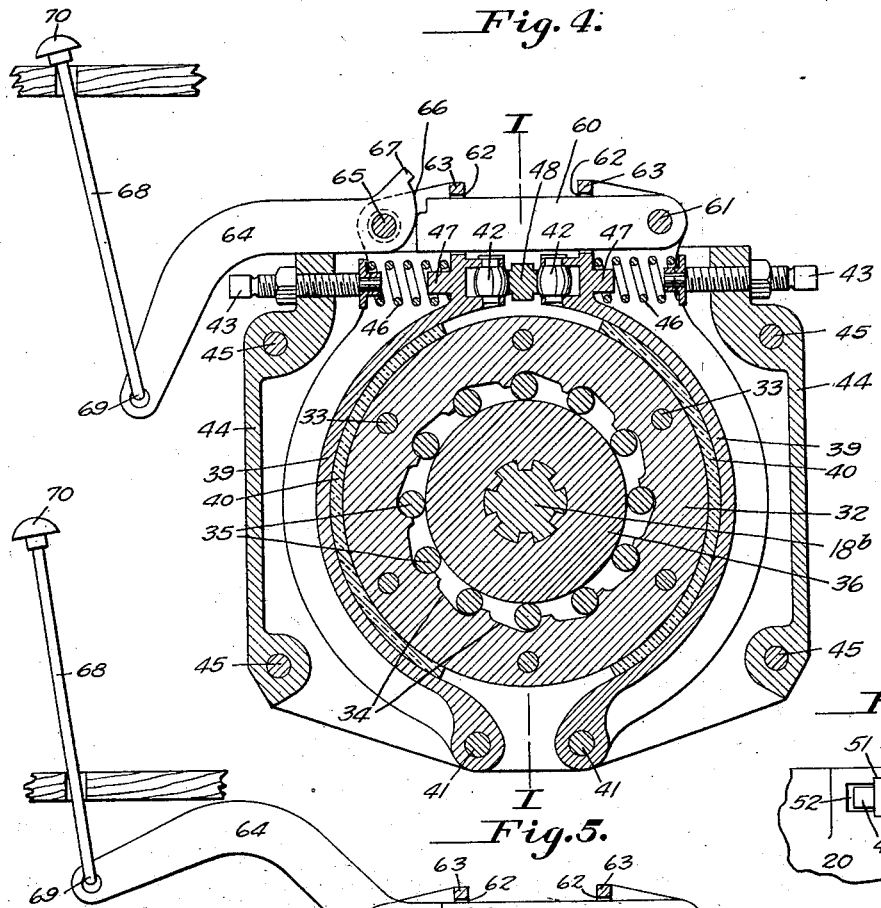
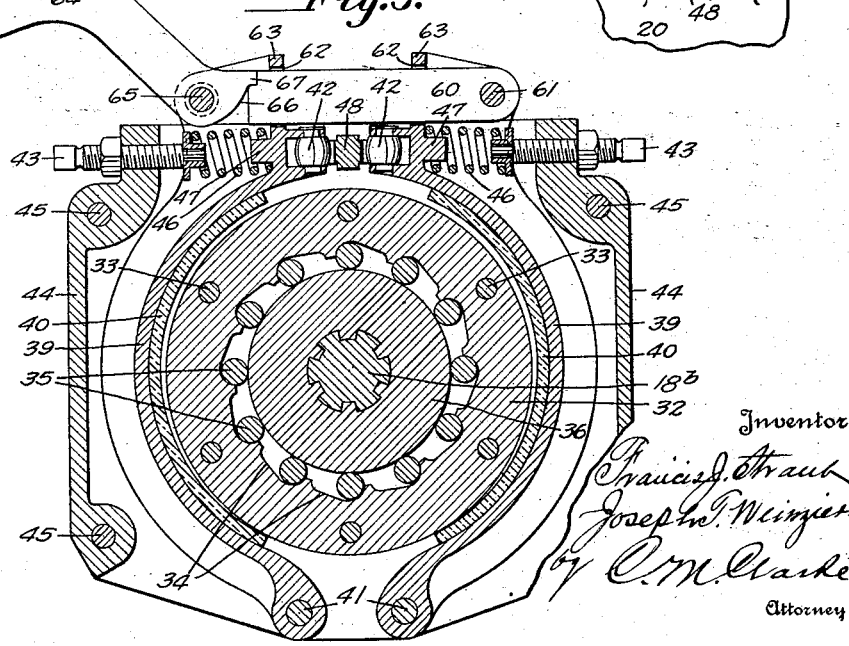

Patented Mar. 15, 1932

1,849,890

UNITED STATES PATENT OFFICE

FRANCIS J. STRAUB AND JOSEPH T. WEINZIERL, OF NEW KENSINGTON, PENNSYLVANIA

MEANS FOR PREVENTING BACK MOVEMENT IN MOTOR VEHICLES

Application filed September 7, 1927. Serial No. 217,928.

Our invention relates to improvements in means for the prevention of undesirable back movement or travel of a motor vehicle under gravity, and subject to operation of the gear shift mechanism. The present improvement is of the general type shown in our prior applications filed October 5, 1926, Serial No. 139,616, and February 24, 1927, Serial No. 170,509, of which this application is a continuation in part.

Ordinarily, when such a vehicle as an automobile becomes stalled on a hill, or is being started up grade from a stationary position, it is difficult to promptly shift the gears without, at the same time, utilizing the ordinary brake equipment, requiring considerable skill and experience for successfully obviating the gravity tendency and for smoothly imparting driving power from the engine to the gears.

Ordinarily, when a motor vehicle is stopped on an up grade, starting is made difficult by the necessity of releasing the brakes at the time the engine picks up the load when the clutch is thrown in. Unless the driver is experienced and careful, an accident may occur if the vehicle gets beyond control and descends the grade backwardly.

The prevention device of this application permits free forward movement of the vehicle, but checks automatically any such backward movement. Likewise, in the case of an engine stalling in an attempt to start the vehicle, such undesired backward movement is prevented by the device engaging or becoming operative upon an initial backward movement.

In our prior application, we mounted a braking mechanism around the secondary shaft between the universal joint coupling and the transmission case, with tightening and loosening means connected with the reverse and low gear shift rod, and with automatically operative interlocking mechanism connecting the braking mechanism with the shaft. In the present invention, we apply the braking means to the propeller shaft behind or beyond the universal joint and incorporate the tightening and loosening means with the torque tube or casing which extends from the universal joint to the axle gear case, in motor vehicles utilizing such type of drive.

The braking apparatus is controlled through wedge or other equivalent means acted upon simultaneously with actuation of the reverse gear shift operation, being in holding position at all other times against reverse movement of the vehicle, with means combined therewith providing for free forward movement on either of the forward shifts.

By subjecting the holding mechanism to movement of the change speed gearing in going into reverse, the device becomes positively inoperative as a brake in reversing the vehicle, and again operative when the gear shift mechanism is in any other position, i. e., neutral, low, intermediate or high. In operating the lock release in shifting into reverse, a slight resistance is encountered which, in the operator's experience, will tend to serve as a warning to prevent undesired shifting into reverse.

In the accompanying drawings, showing one preferred embodiment of the invention:

Fig. 1 is a longitudinal vertical sectional view through the transmission gear case and the universal joint and shaft construction of a motor vehicle on the line I—I of Fig. 4;

Fig. 1ª is a partial view, similar to Fig. 1, showing a modified form of shifting mechanism;

Fig. 2 is a plan view of the operative mechanism of the anti-reverse controlling means for the propeller shaft beyond the gear case;

Fig. 3 is a similar view, showing the opening wedge inserted upon shifting to reverse;

Fig. 4 is a cross section on the line IV—IV of Fig. 1, showing the brake mechanism in holding position;

Fig. 5 is a similar view, showing the brake released;

Fig. 6 is a detail sectional view, showing the wedge mounting.

Referring to Fig. 1, 2 is the usual standard gear shift lever, mounted by its spherical bearing 3 in the supporting casing or housing 4 above the usual transmission casing 5. As is generally understood and practiced, such construction provides for a non-operative or neutral position of lever 2, as in Fig. 1.

An extension 6 of lever 2 extends downwardly between the usual shifting blocks or forks 7 and its opposite block, not shown, block 7 being mounted on the low gear and reverse shift rod 9, slidably mounted in the base of casing 4, as shown in our prior application.

In standard gear shift construction, one of the blocks 7 is provided with an arm 15 for shifting gear 17 on secondary shaft 18 from neutral forward into low gear or backward into reverse gear positions, as indicated in dotted lines, Fig. 1.

Similarly, a fork 16 of the companion block operates to shift gear 19 from neutral position backward into second gear and forward into high gear positions, as indicated.

It will be understood that, ordinarily, with the gears in neutral, unless the usual foot brake or emergency brake is applied, gravity will effect reverse movement of secondary shaft 18 in backing down hill.

It is the purpose of the present invention to provide means for automatically checking and holding the secondary shaft against such gravity-induced reverse movement under all conditions not controlled by the usual brakes until the transmission is in low or other gear moving forward, and independent of the reverse gear position and movement.

The mechanism is therefore designed to hold the car against backward movement on grades until it commences to move forward, and to be inoperative during ordinary backing. This is accomplished by means of a brake drum normally gripped by a spring-tightened band in all positions except reverse, and acting through interlocking mechanism between the brake drum and the propeller shaft 18b to prevent its reversal under the conditions mentioned.

The braking mechanism for applying holding action to the shaft is enclosed within a two-part housing 20 connected by bolts 21 with a sleeve 22 forming the front connection and mounting of the torque tube 23. Between the braking mechanism and the secondary shaft 18 is the universal joint A, of well known construction, enclosed within the spherical shell members 24 and 25. The outer shell 24 is fixedly mounted upon the end of casing 5 surrounding the ball bearings 26 for the rear extension 18a carrying the splined-on hub 27 of the forward half of the universal joint A.

The rear half of the joint is similarly secured by hub 28 on the front end of the propeller shaft 18b within the rear neck portion 29 of casing 25, with an intervening bushing 30.

Neck 29 is in flanged connection with front housing 20 by bolts 21, so that there is thereby provided a continuous enclosing and supporting relatively stationary frame around the propeller shaft and its braking mechanism.

The brake drum is freely rotatable around the shaft 18b in one direction except when locked by the overrunning clutch, i. e., the automatic roller clutch mechanism intervening between the shaft and the drum which is clamped by the brake bands.

The drum itself consists of two annular heads 31 between which is the clutch ring 32, these parts being secured together by bolts 33 and with their peripheries flush for engagement by the brake members.

Clutch ring 32 is provided with an inner annular series of roller pockets 34 of well known construction, providing a rising or binding face at one end and a widening or releasing cavity at the other, for reception of a series of co-acting rollers 35.

Opposing said rollers, and providing an annular concentric bearing therefor, is a sleeve or bushing 36 fixedly mounted as by spline engagement and forming a rotatable portion of shaft 18b.

The rollers 35 are held endwise between the inner portions of outer drum heads 31, and rolling bearings 37 intervene between the heads and bushing 36 for free operation and prevention of endwise shifting. Oil retaining washers 38 of felt are suitably mounted between the ends of the drum hub and the bushing 36 to prevent leakage of oil or entrance of dust or dirt.

As thus arranged, shafts 18 and 18b are free to rotate in the usual counter-clockwise direction when the vehicle is moving forward. On the contrary, reverse rotation of the shafts will be checked by binding action of the rollers in their pockets, assuming the composite drum 31—32 is held against rotation.

When the drum is released, it is in a floating condition, so that the interlocking rollers 35 may function without acting to effect braking control.

For the purpose of either holding or releasing the drum, we utilize two semi-circular brake bands or shoes 39 fitted with linings 40 and pivoted on cross bolts or studs 41 at the bottom. The upper ends of the brake bands 39 are bifurcated, providing bearings for vertically arranged wedge-engaging rollers 42, by which the bands are separated for loosening.

The bands are closed together for variable clamping action on the drum by adjusting set screws 43 mounted at the upper portions of oppositely located spacer plates 44 held between the housings 20 by bolts 45. Cushioning springs 46 provide for desired resiliency between the set screws and centering lugs 47 of the brake bands, providing for compensating pressure against the drum.

Release of the braking mechanism and unclamping of the drum, so as to provide for free movement of the overrunning clutch 32 is effected by separation of the brake bands 39.

For such purpose, we provide a wedge 48 slidably mounted in upwardly extending bearings 49 of the housing 20, in front and back of its middle portion, as in Fig. 1. Wedge 48 is provided with a middle main bar extending above and below the lateral wedging wing members, as at 50. These portions are slidably mounted, as at 51, in bearing terminals 49 of the housings, providing for centralization of the wedge at all times and with free movement therein and clearance of the wedge members 48 at each side, as at 52, Fig. 6.

The wedge is connected by universal or ball joints 53, and an intervening turnbuckle sleeve 54 on threaded stems 55, with a thrust rod 56 at its other end. Said rod extends inwardly through the upper front face of housing 5, being off-set as indicated at 57 for convenient mounting and clearance, and is provided at its inner end with a bearing terminal 58.

A spring 59 intervenes between said terminal and the inner side of the housing, by which the wedge is normally retracted to inoperative position, providing for automatic clamping of the brake bands. Terminal 58 at its innermost position is directly in the rear of gear 17, so that, when said gear is thrust rearwardly to effect reverse movement of shafts 18—18b, with a corresponding backward movement of the vehicle, the wedge will be inserted as in Fig. 3 to effect opening action of the brake bands. Upon shifting gear 17 again into neutral position, the wedge will be automatically retracted by spring 59.

We show in Fig. 1ª a modified arrangement of shifting mechanism for the wedge, in which it is positively connected with the shift rod, somewhat as shown in the prior applications.

In such arrangement the shift rod 9a is slightly lengthened and directly connected by an off-set bracket or bar 57a and flexible joint 53 with the wedge 48, as already described. Positive movement is thus transmitted directly to the wedge in either direction in conformity with the movement of shift bar 9a, effecting loosening or tightening of the brake band, as already described.

When it is desired that the non-reversing mechanism is to be rendered inoperative without shifting into reverse gear, as above described, as may be desirable when moving the vehicle by pushing backwardly into or within a garage, we provide supplemental means for spreading the brake bands, as shown in Fig. 4.

For such purpose, a bar 60 is pivotally mounted at 61 between the side cheeks of the upper portion of one of the brake bands 39, extending through guiding slots 62 of upwardly extending flanges 63 for such purpose, in each brake band.

A lever 64 is pivoted by pin 65 in the same way in the other brake band and is provided with a cam face 66 and a limiting projecting stop 67, adapted to engage against and open the opposite end of bar 60 when the lever is raised.

Raising of the lever is effected by a rod 68 pivoted at 69 and having an upper terminal knob 70 by which the lever may be lifted, as in Fig. 5. By locating rod 68 in a position where it will be readily observed, as in front of the driver's seat, so that it will project upwardly when the brake bands are thus temporarily opened, it will give notice to the operator to lower the lever before commencing to operate the vehicle.

The operating knob 70 may be located in any suitable way, as through the floor board or upwardly through the seat and underneath the cushion, so as to involve displacement of the cushion when lifted, thereby ensuring certainty of replacement before resuming operations.

The operation of the device will be readily understood from the foregoing description. With the wedge 48 normally retracted, the drum consisting of the heads 31 and intervening ring 32 will be tightly gripped by the brake bands and held against rotation until the bands are wedged apart, as described. Such holding action of the bands is ample to effect interlocking engagement with the extended rim portion of bushing 36 through the rollers 35 upon any tendency to reverse movement, while also holding the vehicle when stationary and with the gears in neutral. If a shift is made into low gear and the vehicle is started, the drum will be maintained in clamped condition without rotation, but providing for proper advancing movement of shaft 18b and its holding bushing 36.

Thus, rollers 35 may roll freely into the enlarged portions of their pockets and such conditions will continue during and after shifting into middle and high gear, and at all times when the vehicle is moving forward.

Should it be necessary, however, to stop the vehicle on an up-grade, any slight reverse movement of it by gravitation, effecting reverse movement of shaft 18b, causes rollers 35 to wedge in their pockets, which are relatively stationary because of the brake bands and their inserted linings 40 being held against movement.

Any slight movement of the drum within the band, as by possible slippage, will merely act to absorb any slight shocks. If, now, after a vehicle has been prevented from reverse travel on an up-grade, a shift is made into low gear, the operator needs only to operate the throttle and clutch in the usual way, with no attention whatever to the ordinary brakes, the mechanism effectively holding the car against reverse travel. The same conditions continue through the subsequent forward gear shifts.

On the other hand, if the device is in operation holding the car on an up-grade, and it is desired to move it backward, the gear shift lever may be moved into reverse position, inserting the wedge as in Fig. 3, releasing the brake band by spreading its upper ends. The car will then back downwardly by gravity, with the clutch out, or may be positively backed in the usual way until the gear is shifted into neutral, when the brake band will again become effective.

To hold the forward end of hub 36 in contact with the rear end of universal joint hub 28, spring 71 and sleeves 72 and 73 are provided. The rear sleeve 72 abuts shoulder 74 on propeller shaft 18b so that spring 71 exerts a pressure tending to keep hub 36 in its forward position even when propeller shaft 18b is moved lengthwise when adjusting the mesh of the rear axle ring gear and pinion.

What we claim is:—

1. The combination with the transmission of a motor driven vehicle including gears and shifting means therefor, of a shaft, a drum thereon, clamping bands surrounding the drum having terminal rollers, a plurality of wedging rollers for interlocking the drum and shaft, means for holding the drum, and a longitudinally movable wedge engaging between the terminal rollers for releasing the drum having an extension in confronting relation to one of the shifting gears for contact and movement thereby when the gear is shifted.

2. The combination with the transmission of a motor driven vehicle including gears and shifting means therefor, of a shaft, a drum thereon, clamping bands surrounding the drum having terminal rollers, a plurality of wedging rollers for interlocking the drum and shaft, means for holding the drum, and a longitudinally movable wedge engaging between the terminal rollers for releasing the drum having an operating element extending into the range of movement of one of the gears.

3. In change speed mechanism for motor vehicles, a power imparting shaft having a shifting gear and operating means therefor, a drive shaft coupled with said shaft, a member surrounding the drive shaft having an outer drum face, brake bands therefor having terminal rollers, means between the drive shaft and said drive shaft member for effecting an interlock therebetween when said member is held, means for holding said member, and releasing means therefor including a wedge engaging said rollers and having a portion extending into the range of movement of the shifting gear.

4. In change speed mechanism for motor vehicles, a power imparting shaft having a shifting gear and operating means therefor, a drive shaft coupled with said shaft, a brake drum surrounding the drive shaft having an outer drum face, brake bands therefor having terminal rollers, releasable binding mechanism between the shaft and drum, clamping means surrounding the drum having tightening mechanism, and a longitudinally movable loosening wedge engaging the terminal rollers having a portion extending into the range of movement of the shifting gear.

5. In change speed mechanism for motor vehicles, a power imparting shaft having a shifting gear and operating means therefor, a drive shaft coupled with said shaft, a brake drum surrounding the drive shaft, releasable binding mechanism between the shaft and drum, clamping means surrounding the drum having terminal rollers, closing springs therefor, and oppositely acting spreading means for opening the clamping means including a longitudinally movable wedge engaging the rollers and having a portion extending into the range of movement of the shifting gear.

6. In change speed mechanism for motor vehicles, a power imparting shaft having a shifting gear and operating means therefor, a drive shaft coupled with said shaft, a brake drum surrounding the drive shaft, releasable binding mechanism between the shaft and drum, clamping means surrounding the drum having tightening mechanism, and a longitudinally movable wedge engaging the clamping means having an extension adapted to be moved by the shifting gear for loosening the binding mechanism and provided with a flexible connection between the wedge and said extension.

7. In change speed mechanism for motor vehicles, a power imparting shaft having a shifting gear and operating means therefor, a drive shaft coupled with said shaft, a brake drum surrounding the drive shaft having a series of locking and unlocking rollers and sockets therefor operable to grip the shaft in one direction and to release it in the opposite direction, brake band sections surrounding the drum having spring contracted terminals, and a longitudinally movable wedge for opening the brake band operable by the shifting gear.

8. In change speed mechanism for motor vehicles, a power imparting shaft having a shifting gear and operating means therefor, a drive shaft coupled with said shaft, a brake band surrounding the drive shaft having a series of locking and unlocking rollers and sockets therefor operable to grip the shaft in one direction and to release it in the opposite direction, brake band sections surrounding the drum having spring contracted terminals, and a longitudinally movable wedge for opening the brake band operable by the shifting gear.

9. In combination with the transmission of a motor driven vehicle including a power shaft, a shifting gear thereon, shifting means therefor, and a casing; a drive shaft having a torque tube, a coupling between the drive shaft and the power shaft, and means including a brake drum and clamping bands therefor and a separating wedge for holding or releasing the drive shaft incorporated with the torque tube having a wedge controlling extension operable by the shifting gear.

10. In combination with the transmission of a motor driven vehicle including a power shaft, a shifting gear thereon, shifting means therefor, and a casing; a drive shaft having a torque tube, a coupling between the drive shaft and the power shaft, and means including a brake drum and clamping bands therefor and a separating wedge for holding or releasing the drive shaft incorporated with the torque tube having a wedge controlling extension operable by the shifting gear and provided with a flexible coupling between the transmission casing and the holding and releasing means.

11. The combination with a drive shaft having a fixed annular roller bearing disk thereon and a surrounding housing, of a brake drum surrounding the shaft having a series of locking and unlocking rollers and sockets therefor, operable to grip the disk in one direction and to release it in the opposite direction, a pair of semi-circular brake bands surrounding the drum having spring contracted terminals, and a longitudinally movable wedge for separating the terminals to release the drum.

12. The combination with a drive shaft having a fixed annular roller bearing disk thereon and a surrounding housing, of a brake drum surrounding the shaft having a series of locking and unlocking rollers and sockets therefor, operable to grip the disk in one direction and to release it in the opposite direction, a pair of semi-circular brake bands surrounding the drum having spring contracted terminals and bearing portions, and a wedge movably mounted between the bearing portions for separating the terminals to release the drum.

13. The combination with a drive shaft having a fixed annular roller bearing disk thereon and a surrounding housing, of a brake drum surrounding the shaft having a series of locking and unlocking rollers and sockets therefor operable to grip the disk in one direction and to release it in the opposite direction, a pair of semi-circular brake bands surrounding the drum having spring contracted terminals and bearing rollers, and a wedge movably mounted in the housing between the rollers for separating the brake bands to release the drum.

14. The combination with a pair of clamping bands as described, each having an independent closing spring, of a separating bar connected with the terminal of one of the bands and extending towards the other, and a retracting lever on the terminal of the other band adapted to engage directly against the end of the bar and separate the bands.

15. The combination with the terminals of brake band clamping mechanism and means normally holding them closed, of a separating strut bar connected with one of the terminals and extending through the other, and a lever pivoted in the other terminal having a cam adapted to engage directly against the end of the strut bar to expand the terminals.

16. The combination with the terminals of brake band clamping mechanism and means normally holding them closed, of a separating strut bar connected with one of the terminals and extending through the other, a lever pivoted in the other terminal having a cam adapted to engage the strut bar to expand the terminals and a limiting lug, and a lifting rod pivotally connected with the lever and having a grasping terminal.

In testimony whereof we hereunto affix our signatures.

FRANCIS J. STRAUB.
JOSEPH T. WEINZIERL.